United States Patent [19]

Daimon et al.

[11] 4,067,819
[45] Jan. 10, 1978

[54] SYNTHETIC TETRA-SILICIC MICA AND WATER SOL THEREOF

[76] Inventors: Nobutoshi Daimon, 195-112, Aza Kanda, Mikuriya, Kawanakajima-cho, Nagano, Nagano; Kunio Kitajima, 1700-9-5, Wakasato, Nagano, Nagano, both of Japan

[21] Appl. No.: 669,451

[22] Filed: Mar. 22, 1976

[51] Int. Cl.$^2$ .................. B01J 13/00; C01B 33/24
[52] U.S. Cl. .................. 252/313 S; 106/15 FP; 106/38.2; 106/291; 106/DIG. 3; 252/63; 252/63.2; 252/63.5; 252/378 R; 423/331
[58] Field of Search .................. 252/313 R, 313 S; 423/331; 106/DIG. 3

[56] References Cited
U.S. PATENT DOCUMENTS 3,839,055  10/1974  Grossman ............... 106/DIG. 3
3,936,383  2/1976   Daimon et al. .......... 423/331 X

OTHER PUBLICATIONS

Hatch et al.: "Synthetic Mica Investigations, Part IX, Review of Progress from 1947 to 1955", U.S. Dept. of Interior, Bureau of Mines, June (1957).
Grossman: "Machinable Glass–Ceramics Based on Tetrasilicic Mica", J. Amer. Ceramic Soc., 55, [9], 446–449 (1972) [TP 785 A62].

*Primary Examiner*—Richard D. Lovering
*Attorney, Agent, or Firm*—Wenderoth, Lind & Ponack

[57] ABSTRACT

This invention relates to a process for producing a tetra-silicic mica having the formula $Na_{0.6-0.8}Mg_{2.6-2.7}(Si_4O_{10})F_2$ which comprises mixing components selected from the group of sodium fluoride (NaF, sodium silicofluoride ($Na_2SiF_6$), magnesium fluoride ($MgF_2$), magnesia (MgO) and silica ($SiO_2$) in a mole ratio of (a) 1 – 1.2 NaF : 0.5 – 1.2 $MgF_2$ : 2 MgO : 4 $SiO_2$ or (b) 0.5 – 0.8 $Na_2SiF_6$ : 0.5 – 1.2 $MgF_2$ : 2 MgO : 4 $SiO_2$, melting the mixture at a temperature of 1300° C to 1500° C and cooling the melt to obtain a crystal.

This invention further relates to a water sol of flake-like ultra-fine particles of tetra-silicic mica produced in accordance with claim 1, wherein most of the flake-like particles dispersed in water have a thickness of less than 50 A and an average diameter of the flat plane of between 500 A and 3000 A.

3 Claims, No Drawings

SYNTHETIC TETRA-SILICIC MICA AND WATER SOL THEREOF

DETAILED EXPLANATION OF THE INVENTION

This invention relates to a process of producing improved synthetic tetra-silicic mica which can be cleft into ultra-fine particles by hydration and a water sol of the mica.

Synthetic mica is a layered structure material, which is strong in the directional parallel to the layer, but which is weakly bonded between layers. Accordingly, pulverized mica naturally becomes flake-like particles.

Mica particles pulverized by mechanical means have a thickness of more than 200 A at the smallest. It is impossible to obtain mica particles having a thickness of less than 200 A by mechanical means, and it is difficult to form a stable suspension such as a sol or gel using such coarse particles.

It is known that certain mica can be cloven into small particles to some extent by hydration by introducing water between the crystal layers. However, in order to obtain ultra-fine particles having a thickness of less than 50 A, conventional mica must then be heated to 300° – 500° C, thereby vaporizing the water between the layers and further cleaving the particles.

Flake-like ultra-fine mica particles having a thickness of less than 50 A have the following unique properties:

a. They form a stable and uniform sol in water (even in an amount of less than 1 weight %). A 7 – 10 weight % sol of these flake-like ultra-fine particles can be easily molded into a film by spreading the sol on a substrate and drying. The flake-like ultra-fine mica particles provide a strong cohesive force, and they are self-bonded to each other by the action of Van der Waals molecular cohension force. The particles overlap in parallel and form a film having a strong tensile strength.

b. These ultra-fine mica particles have negatively charged oxygen atoms coordinated on the surface of the particles and between layers. Due to this activity, the mica reacts and bonds with organic materials.

Using these unique properties, the flake-like ultra-fine mica particles of this invention can be formed into electric insulating film, heat-resistant sheet and a composite with synthetic resin. These products have excellent heat-resistance and electrical insulating properties. They can also be used in combination with mineral fibers such as glass, rock wool, silica, alumina, silicate and the like to prepare a non-flammable sheet. The non-flammable sheet thus prepared is highly flexible. The flexibility is due to the fact that the ultra-fine particles of mica of this invention are flake-like particles uniformly cleft to molecular size, and the fact that the flakes are reformed into a product by uniform overlapping.

In addition to the above uses, this synthetic mica is used as a base for various paints and as a starting material for the preparation of non-flammable building materials.

A typical example of the conventional micas which are known to be swellable by hydration is Na-taeniolite, expressed by the formula $NaMg_2Li(Si_4O_{10})f_2$.

Na-taeniolite can be synthesized, and has been heretofore used to prepare reformed mica products. However, conventional Na-taeniolite stops swelling in water at the tetra-hydrate stage, i.e. $NaMg_2Li(Si_4O_{10})F_2 \cdot 4 H_2O$, and hydration does not proceed any further. This is a "limited" swelling type of hydration. In order to obtain the desirable finer particles which provide an effective cohesive force, the tetra-hydrate particles must be subjected to hearing at 300°–550° C. Moreover, since a single heating step does not always provide satisfactory fine particles, it is necessary to repeat the hydration step and the heating step several times in order to complete the cleavage and to obtain satisfactory ultra-fine particles suitable for practical use. The need for the heating procedure makes conventional Na-taeniolite less suitable for industrial use.

Accordingly, an object of this invention is to provide a synthetic mica which can be swollen to desired ultra-fine particles by hydration only without any heating step.

We have found as a result of study of the hydration or swelling mechanism of mica that mica having a satisfactorily hydratable structure should have the following conditions:

a. the bonding between layers should be weak;
b. the hydration energy of ions between layers should be high; and
c. the ionic radius of ions between layers should be small and the valence of ions between layers should be as low as possible.

Thus, hydratable ions such as $Na^+$, $Li^+$ and $Ca^{2+}$ must be coordinated between layers.

Tetra-silicic mica having the formula, $Na_{0.6-0.8}Mg_{2.6-2.7}(Si_4O_{10})F_2$ produced in accordance with the present invention satisfies the above conditions. Moreover, as can be seen from the above formula, the ions between layers, i.e. $Na^+$, are deficient. That is, 2 to 4 molecules of Na between layers are deficient per 10 molecules of mica. Consequently, the bonding between layers is quite unstable or weak in comparison with regular tetra-silicic mica wherein one cation per one molecule of mica is regularly coordinated between layers. Regular tetra-silicic mica has the formula, $NaMg_{2.5}(Si_4O_{10})F_2$, while the tetra-silicic mica of the present invention having improved hydratability has the formula, $Na_{0.6-0.8}Mg_{2.6-2.7}(Si_4O_{10})F_2$ wherein $Mg^{2+}$ ions in the octahedron layer are increased and $Na^+$ ions between layers are decreased in proportion to the increase of the $Mg^{2+}$ ions.

The improved tetra-silicic mica of this invention can be easily swollen and cleft into flake-like ultra-fine particles which provide effective Van der Waals molecular cohesion force, and which can be easily formed into a film and various other products. The swelling or cleavage of the mica of this invention can be efficiently done by a single hydration reaction without any heating procedure as in conventional mica. This is a "free swelling" type of hydration, and it is only a very small part (less that 3 %) of the particles that remain in the tri-hydrate stage. All other mica particles are completely swollen and cleft into flake-like ultra-fine particles having a thickness of less than 50 A and an average diameter of the flat plane of the flake ranging between 500 A and 3000 A.

The mica of this invention is generally swollen and cleft into ultra-fine particles in 50 to 100 times the amount of water while stirring, thereby forming a uniform suspension of the particles. The swelling time can be shortened by subjecting the mica in an atmosphere of water vapor before bathing in water.

The water sol of the ultra-fine mica particles of this invention is cohered and molded into a product by dehydration, and optionally, compression, but the presence of hydratable ions, i.e. $Na^+$, in the product reversibly causes re-hydration and swelling. Such hydratable ions must be replaced by non-hydratable ions at the suspension stage or after being molded into a product, thereby making the product non-hydratable. This ion-exchange can be conveniently carried out by bathing the suspension or the product in a salt solution containing $K^+$, $Ba^{2+}$, $Al^{3+}$, $Pb^{2+}$, $Ag+$ or $Mg^{2+}$, for example a 10 - 80 % electrolytic solution such as KCOOH, $KNO_3$, $Ba(NO_3)_2$, $AlCl_3$, $Pb(NO_3)_2$, $AgNO_3$ and the like at from room temperature to 60° C.

The starting materials used in producing the mica of this invention are sodium fluoride (NaF), sodium silicofluoride ($Na_2SiF_6$), magnesium fluoride ($MgF_2$), magnesia (MgO) and silica ($SiO_2$).

These materials are mixed in a mole ratio of (a) 1–1.2 NaF : 0.5–1.2 $MgF_2$ : 2 MgO : 4 $SiO_2$ or (b) 0.5–0.8 $Na_2SiF_6$ : 0.5–1.2 $MgF_2$ : 2 MgO : 4 $SiO_2$. The mixture is then melted at a temperature of 1300° C - 1500° C, preferably 1400° C.

The melting procedure can be conducted by employing any of the well-known internal heating techniques, external heating techniques using an alkali-resistant crucible made of platinum, SiC, graphite, beryllium oxide, alumina and the like, and electrical heating techniques using an electric conductor crucible made of platinum, graphite and the like, or a furnace with conductive electrodes. According to the internal heating techniques, the mixture of starting materials is filled around a pair of carbon electrodes connected to a carbonaceous electric heating element, and is melted by applying an electric current thereto. After the carbonaceous electric heating element is totally consumed by oxidation, the melting starting materials, which can be a resistive element, take the place of the heating element. Thus, melting is continued using the melt as the heating element and the sintered layer which forms around the container as a crucible.

The melt is then cooled to obtain a crystal.

The present invention is further illustrated by the following Examples.

EXAMPLE 1

120 kg of a mixture of starting materials was prepared in the following weight ratio corresponding to a mole ratio of NaF : $MgF_2$ : 2 MgO : 4 $SiO_2$.

sodium fluoride (NaF) — 10%
magnesium fluoride ($MgF_2$) — 14%
magnesia (MgO) — 18%
silica ($SiO_2$) — 58%

The above prepared mixture was then charged in a furnace of 50 cm (length) × 50 cm (width) × 100 cm (depth) lined with chamotte brick (SK No. 32), and was melted at 1400° C for 4 hours by means of an internal heating technique. The melt was then cooled by allowing it to stand until 23 kg of a crystal was obtained. The crystal lump thus obtained was allowed to stand in the atmosphere of water vapor for 1 hour to swell the crystal. The swollen crystal was then bathed while stirring in a water tank containing 1,000 liters of water for 3 hours, thus forming a sol of flake-like ultra-fine particles of the crystal. During this procedure, 0.95 kg of impurities such as unreacted materials and glassy materials settled on the bottom of the tank.

Almost all of the flake-like ultra-fine particles thus prepared had a thickness of less than 50 A while the average diameter of the flat plane ranged between 500 A and 3000 A. Thus, the swelling of the crystal was "free-swelling", and the cleavage of the crystal was rapidly and completely carried out by hydration. According to flame spectrochemical analysis, it was proved that this crystal was Na ion (between layers)-deficient type tetra-silicic mica having the composition of $Na_{0.7}Mg_{2.65}(Si_4O_{10})F_2$.

EXAMPLE 2

120 kg of a mixture of starting materials was prepared in the following weight ratio corresponding to a mole ratio of ½ $Na_2SiF_6$ : ½ $MgF_2$ : 2 MgO : 4 $SiO_2$.

sodium silicofluoride ($Na_2SiF_6$) — 21%
magnesium fluoride ($MgF_2$) — 7%
magnesia (MgO) — 18%
silica ($SiO_2$) — 54%

The mixture was melted at 1400° C for 4 hours in the same manner as in Example 1, and the melt was then cooled by allowing it to stand until 20.5 kg of a crystal was obtained. The crystal lump thus obtained was allowed to stand in the atmosphere of water vapor for 1 hour to swell the crystal. The swollen crystal was then bathed while stirring in a water tank containing 1,000 liters of water for 3 hours, thus forming a sol of flake-like ultra-fine particles of the crystal. During this procedure, 1.2 kg of impurities such as unreacted materials and glassy materials settled on the bottom of the tank.

Almost all of the flake-like ultra-fine particles thus prepared had a thickness of less than 50 A while the average diameter of the flat plane ranged from 500 A to 3000 A. Thus, the swelling of the crystal was "free-swelling", and the cleavage of the crystal was rapidly and completely carried out by hydration. According to flame spectrochemical analysis, it was proved that this crystal was Na ion (between layers)-deficient type tetra-silicic mica having the composition of $Na_{0.6}Mg_{2.7}(Si_4O_{10})F_2$.

We claim:

1. Synthetic tetra-silicic mica having the formula $Na_{0.6-0.8}Mg_{2.6-2.7}(Si_4O_{10})F_2$ which is swellable and cleavable in water without heating, thus producing particles having a thickness of less than 50 A and an average diameter of the flat plane of between 500 A and 3000 A.

2. Water sol of flake-like ultra-fine particles of tetra-silicic mica having the formula $Na_{0.6-0.8}Mg_{2.6-2.7}(Si_4O_{10})F_2$, prepared by swelling and cleaving the tetra-silicic mica in water without heating and having a thickness of less than 50 A and an average diameter of the flat plane of between 500 A and 3000 A.

3. A synthetic tetra-silicic mica according to claim 1 produced by the process which comprises preparing a mixture on a molar basis of (a) 1–1.2 NaF : 0.15–1.2 $MgF_2$ : 2 MgO : 4 $SiO_2$ or (b) 0.5–0.8 $Na_2SiF_6$ : 0.5–1.2 $MgF_2$ : 2 MgO : 4 $SiO_2$, melting the mixture at a temperature of 1300° C to 1500° C and cooling the melt to obtain said mica crystalline form.

* * * * *